United States Patent
Kalyanasundharam et al.

(10) Patent No.: US 10,545,875 B2
(45) Date of Patent: Jan. 28, 2020

(54) TAG ACCELERATOR FOR LOW LATENCY DRAM CACHE

(71) Applicant: Advanced Micro Devices, Inc., Sunnyvale, CA (US)

(72) Inventors: Vydhyanathan Kalyanasundharam, San Jose, CA (US); Kevin M. Lepak, Austin, TX (US); Ganesh Balakrishnan, Austin, TX (US); Ravindra N. Bhargava, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 23 days.

(21) Appl. No.: 15/855,838

(22) Filed: Dec. 27, 2017

(65) Prior Publication Data

US 2019/0196974 A1 Jun. 27, 2019

(51) Int. Cl.
*G06F 12/0897* (2016.01)
*G06F 12/121* (2016.01)

(52) U.S. Cl.
CPC ........ *G06F 12/0897* (2013.01); *G06F 12/121* (2013.01); *G06F 2212/1024* (2013.01); *G06F 2212/608* (2013.01)

(58) Field of Classification Search
None
See application file for complete search history.

(56) References Cited

U.S. PATENT DOCUMENTS

| | | | |
|---|---|---|---|
| 6,687,789 B1 | 2/2004 | Keller et al. | |
| 6,728,790 B2 | 4/2004 | Ennis | |
| 7,107,367 B1 | 9/2006 | Hughes | |
| 9,753,858 B2 | 9/2017 | Loh et al. | |
| 2002/0060684 A1* | 5/2002 | Alcorn | G06T 15/04 345/552 |
| 2013/0138892 A1* | 5/2013 | Loh | G06F 12/0864 711/134 |
| 2014/0164713 A1* | 6/2014 | Sim | G06F 12/0888 711/138 |
| 2014/0181384 A1* | 6/2014 | Loh | G06F 12/00 711/104 |

FOREIGN PATENT DOCUMENTS

WO WO-2018100331 A1 * 6/2018 ......... G06F 12/0846

* cited by examiner

*Primary Examiner* — Denise Tran
(74) *Attorney, Agent, or Firm* — Meyertons Hood Kivlin Kowert & Goetzel PC; Rory D. Rankin (57) ABSTRACT

Systems, apparatuses, and methods for implementing a tag accelerator cache are disclosed. A system includes at least a data cache and a control unit coupled to the data cache via a memory controller. The control unit includes a tag accelerator cache (TAC) for caching tag blocks fetched from the data cache. The data cache is organized such that multiple tags are retrieved in a single access. This allows hiding the tag latency penalty for future accesses to neighboring tags and improves cache bandwidth. When a tag block is fetched from the data cache, the tag block is cached in the TAC. Memory requests received by the control unit first lookup the TAC before being forwarded to the data cache. Due to the presence of spatial locality in applications, the TAC can filter out a large percentage of tag accesses to the data cache, resulting in latency and bandwidth savings.

20 Claims, 10 Drawing Sheets

TAG ACCELERATOR FOR LOW LATENCY DRAM CACHE

BACKGROUND

Description of the Related Art

Cache subsystems in a computing system include high-speed cache memories configured to store blocks of data. As used herein, a "cache line" is a set of bytes stored in contiguous memory locations, which are treated as a unit for coherency purposes. In some embodiments, a cache line can also be the unit of allocation and deallocation in a cache. The number of bytes in a cache line is varied according to design choice, and can be of any size.

In multi-node computer systems, special precautions must be taken to maintain coherency of data that is being used by different processing nodes. For example, if a processor attempts to access data at a certain memory address, it must first determine whether the memory is stored in another cache and has been modified. To implement this cache coherency protocol, caches typically contain multiple status bits to indicate the status of the cache line to maintain data coherency throughout the system. One common coherency protocol is known as the "MOESI" protocol. According to the MOESI protocol each cache line includes status bits to indicate which MOESI state the line is in, including bits that indicate that the cache line has been modified (M), that the cache line is exclusive (E) or shared (S), or that the cache line is invalid (I). The Owned (O) state indicates that the line is modified in one cache, that there may be shared copies in other caches and that the data in memory is stale.

Low latency dynamic random access memory (DRAM) devices like high bandwidth memory (HBM) are attractive as central processing unit (CPU) caches due to their large capacity and high bandwidth. However, large caches also typically utilize large static random-access memory (SRAM) tag arrays which are expensive to build. Rather than building a large SRAM tag array, some modern large cache implementations co-locate tags and data in the large cache. This makes the implementation scalable at the expense of increased lookup latency and cache bandwidth.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for implementing a tag accelerator cache are disclosed herein. A system includes at least a data cache and a control unit coupled to the data cache via a memory controller. The control unit includes a tag accelerator cache for caching tag blocks fetched from the data cache. The data cache is organized such that multiple tags (i.e., a tag block) are retrieved in a single access. This allows hiding the tag latency penalty for future accesses to neighboring tags and improves cache bandwidth. When a tag block of multiple tags is fetched from the data cache, the tag block is cached in the tag accelerator cache. Memory requests received by the control unit first lookup the tag accelerator cache before being forwarded to the data cache. Due to the presence of spatial locality in applications, the tag accelerator cache can filter out a large percentage of tag accesses to the data cache, resulting in latency and bandwidth savings.

Figure 1:
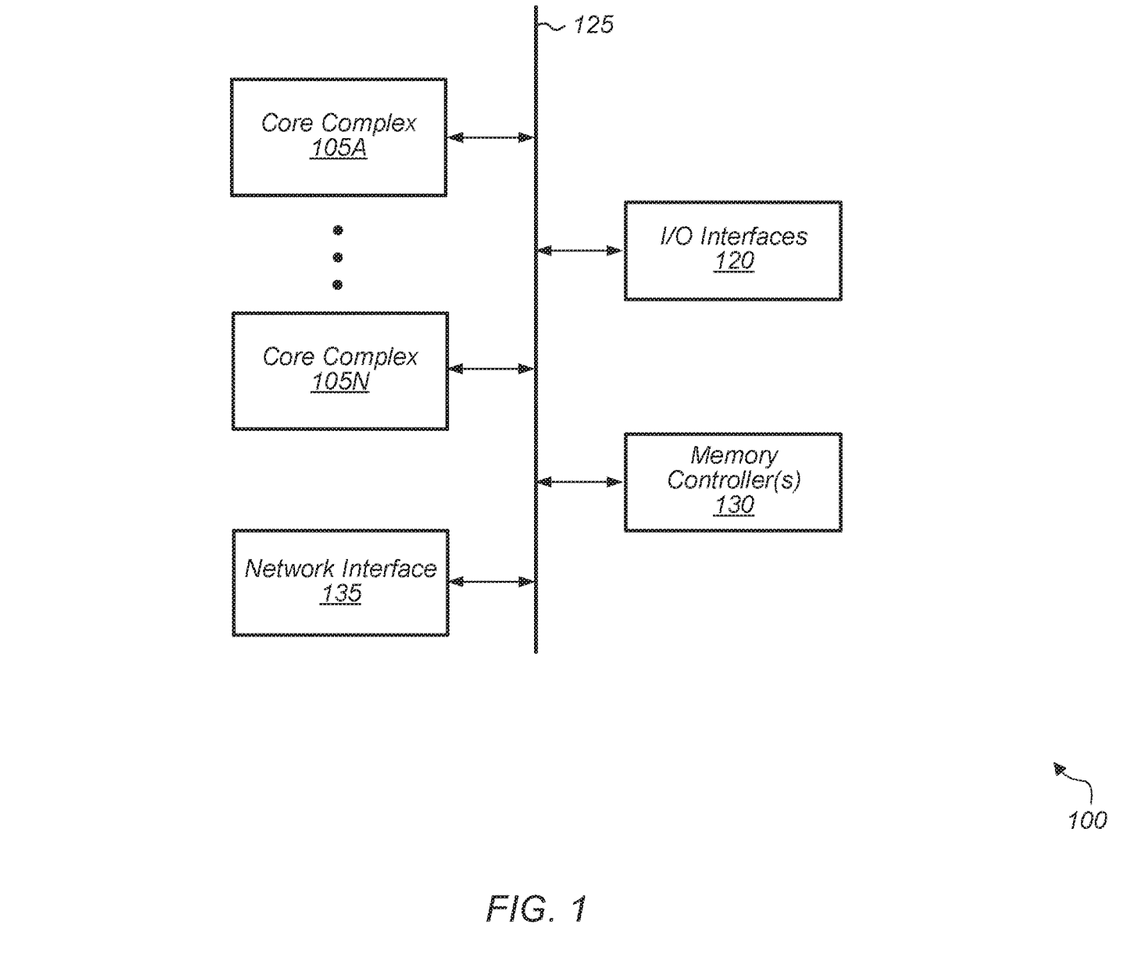
FIG. 1 is a block diagram of one embodiment of a computing system.

Referring now to FIG. 1, a block diagram of one embodiment of a computing system 100 is shown. In one embodiment, computing system 100 includes at least core complexes 105A-N, input/output (I/O) interfaces 120, bus 125, memory controller(s) 130, and network interface 135. In other embodiments, computing system 100 can include other components and/or computing system 100 can be arranged differently. In one embodiment, each core complex 105A-N includes one or more general purpose processors, such as central processing units (CPUs). It is noted that a "core complex" can also be referred to as a "processing node" or a "CPU" herein. In some embodiments, one or more core complexes 105A-N can include a data parallel processor with a highly parallel architecture. Examples of data parallel processors include graphics processing units (GPUs), digital signal processors (DSPs), and so forth. Each processor core within core complex 105A-N includes a cache subsystem with one or more levels of caches. In one embodiment, each core complex 105A-N includes a cache (e.g., level three (L3) cache) which is shared between multiple processor cores.

Memory controller(s) 130 are representative of any number and type of memory controllers accessible by core complexes 105A-N. Memory controller(s) 130 are coupled to any number and type of memory devices (not shown). For example, the type of memory in memory device(s) coupled to memory controller(s) 130 can include Dynamic Random Access Memory (DRAM), Static Random Access Memory (SRAM), NAND Flash memory, NOR flash memory, Ferroelectric Random Access Memory (FeRAM), or others. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth.

In various embodiments, computing system 100 can be a server, computer, laptop, mobile device, game console, streaming device, wearable device, or any of various other types of computing systems or devices. It is noted that the number of components of computing system 100 can vary from embodiment to embodiment. There can be more or fewer of each component/subcomponent than the number shown in FIG. 1. It is also noted that computing system 100 can include other components not shown in FIG. 1. Additionally, in other embodiments, computing system 100 can be structured in other ways than shown in FIG. 1.

Figure 2:
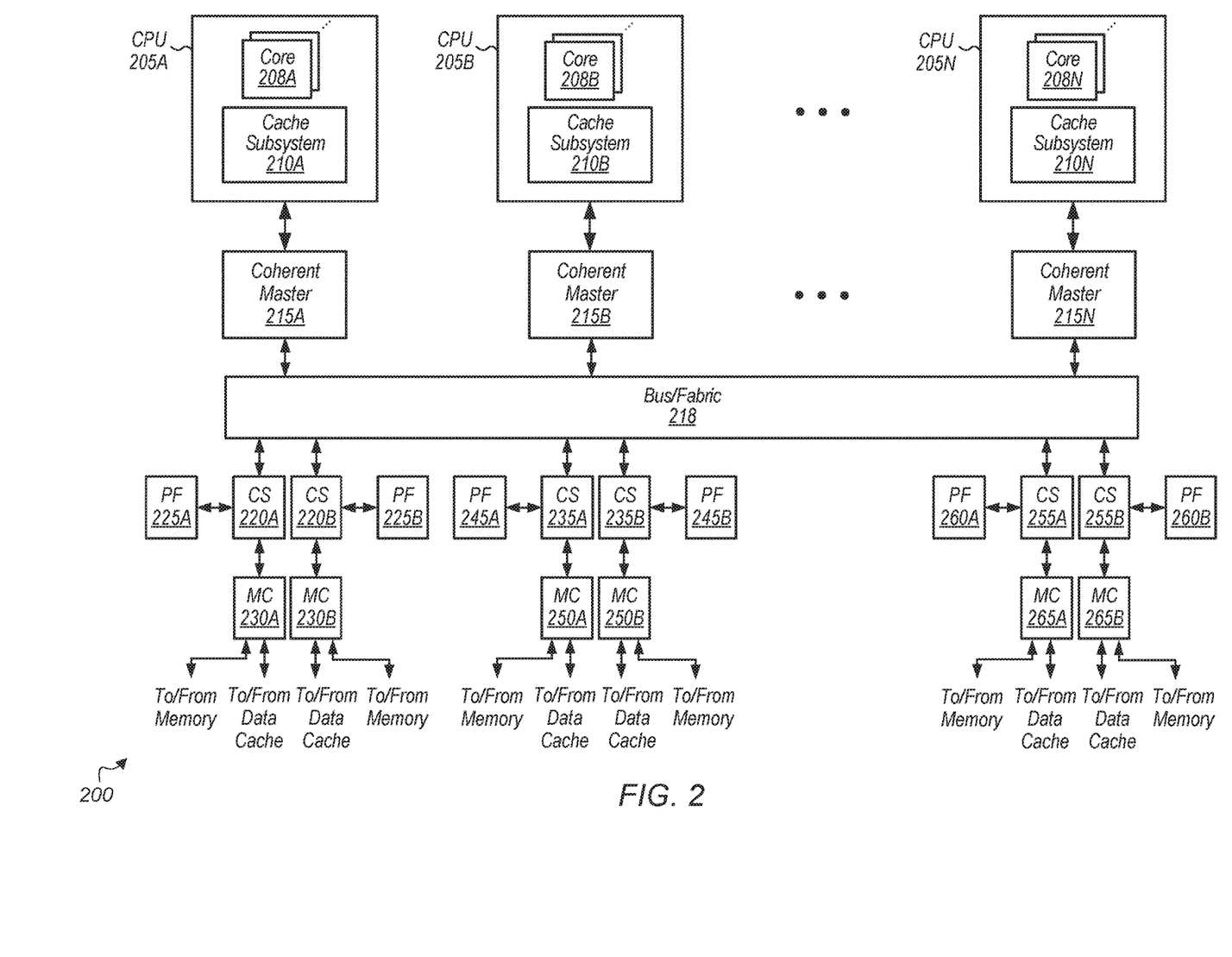
FIG. 2 is a block diagram of one embodiment of a multi-CPU system.

Turning now to FIG. 2, a block diagram of one embodiment of a multi-CPU system 200 is shown. In one embodiment, system includes multiple CPUs 205A-N. The number of CPUs per system can vary from embodiment to embodiment. Each CPU 205A-N can include any number of cores 208A-N, respectively, with the number of cores varying according to the embodiment. Each CPU 205A-N also includes a corresponding cache subsystem 210A-N. Each cache subsystem 210A-N can include any number of levels of caches and any type of cache hierarchy structure.

In one embodiment, each CPU 205A-N is connected to a corresponding coherent master 215A-N. As used herein, a "coherent master" is defined as an agent that processes traffic flowing over an interconnect (e.g., bus/fabric 218) and manages coherency for a connected CPU. To manage coherency, a coherent master receives and processes coherency-related messages and probes and generates coherency-related requests and probes. It is noted that a "coherent master" can also be referred to as a "coherent master unit" herein.

In one embodiment, each CPU 205A-N is coupled to a pair of coherent slaves via a corresponding coherent master 215A-N and bus/fabric 218. For example, CPU 205A is coupled through coherent master 215A and bus/fabric 218 to coherent slaves 220A-B. It is noted that although not shown in FIG. 2, in other embodiments there can be other connections from bus/fabric 218 to other components not shown to avoid obscuring the figure. For example, in another embodiment, bus/fabric 218 includes connections to one or more I/O interfaces and one or more I/O devices.

Coherent slave (CS) 220A is coupled to memory controller (MC) 230A and coherent slave 220B is coupled to memory controller 230B. Coherent slave 220A is coupled to probe filter (PF) 225A, with probe filter 225A including entries for memory regions that have cache lines cached in system 200 for the memory accessible through memory controller 230A. It is noted that probe filter 225A, and each of the other probe filters, can also be referred to as a "cache directory". Similarly, coherent slave 220B is coupled to probe filter 225B, with probe filter 225B including entries for memory regions that have cache lines cached in system 200 for the memory accessible through memory controller 230B. It is noted that the example of having two memory controllers per CPU is merely indicative of one embodiment. It should be understood that in other embodiments, each CPU 205A-N can be connected to other numbers of memory controllers besides two.

In a similar configuration to that of CPU 205A, CPU 205B is coupled to coherent slaves 235A-B via coherent master 215B and bus/fabric 218. Coherent slave 235A is coupled to memory via memory controller 250A, and coherent slave 235A is also coupled to probe filter 245A to manage the coherency of cache lines corresponding to memory accessible through memory controller 250A. Coherent slave 235B is coupled to probe filter 245B and coherent slave 235B is coupled to memory via memory controller 265B. Also, CPU 205N is coupled to coherent slaves 255A-B via coherent master 215N and bus/fabric 218. Coherent slaves 255A-B are coupled to probe filter 260A-B, respectively, and coherent slaves 255A-B are coupled to memory via memory controllers 265A-B, respectively. As used herein, a "coherent slave" is defined as an agent that manages coherency by processing received requests and probes that target a corresponding memory controller. It is noted that a "coherent slave" can also be referred to as a "coherent slave unit" or "control unit" herein. Additionally, as used herein, a "probe" is defined as a message passed from a coherency point to one or more caches in the computer system to determine if the caches have a copy of a block of data and optionally to indicate the state into which the cache should place the block of data.

When a coherent slave receives a memory request targeting its corresponding memory controller, the coherent slave performs a tag lookup of a tag accelerator cache (not shown). If the tag lookup of the tag accelerator cache results in a hit, then this indicates the corresponding cache line is stored in the corresponding data cache. The data address corresponding to the matching tag is retrieved from the tag accelerator cache, and then the memory request is sent to the data cache to access the targeted cache line at a location within the data cache specified by the data address. In one embodiment, the tag accelerator cache is implemented with static random-access memory (SRAM) and the data cache is implemented with dynamic random-access memory (DRAM). If the tag lookup of the tag accelerator cache results in a miss, then the memory request is forwarded to the data cache and a tag lookup of the data cache is performed for the memory request. When a tag lookup hits in the data cache, a tag block of multiple tags is retrieved and cached in the tag accelerator cache. This allows subsequent memory requests the possibility of hitting on the adjacent tags of the tag block, which can help reduce latency and cache bandwidth.

Figure 3:
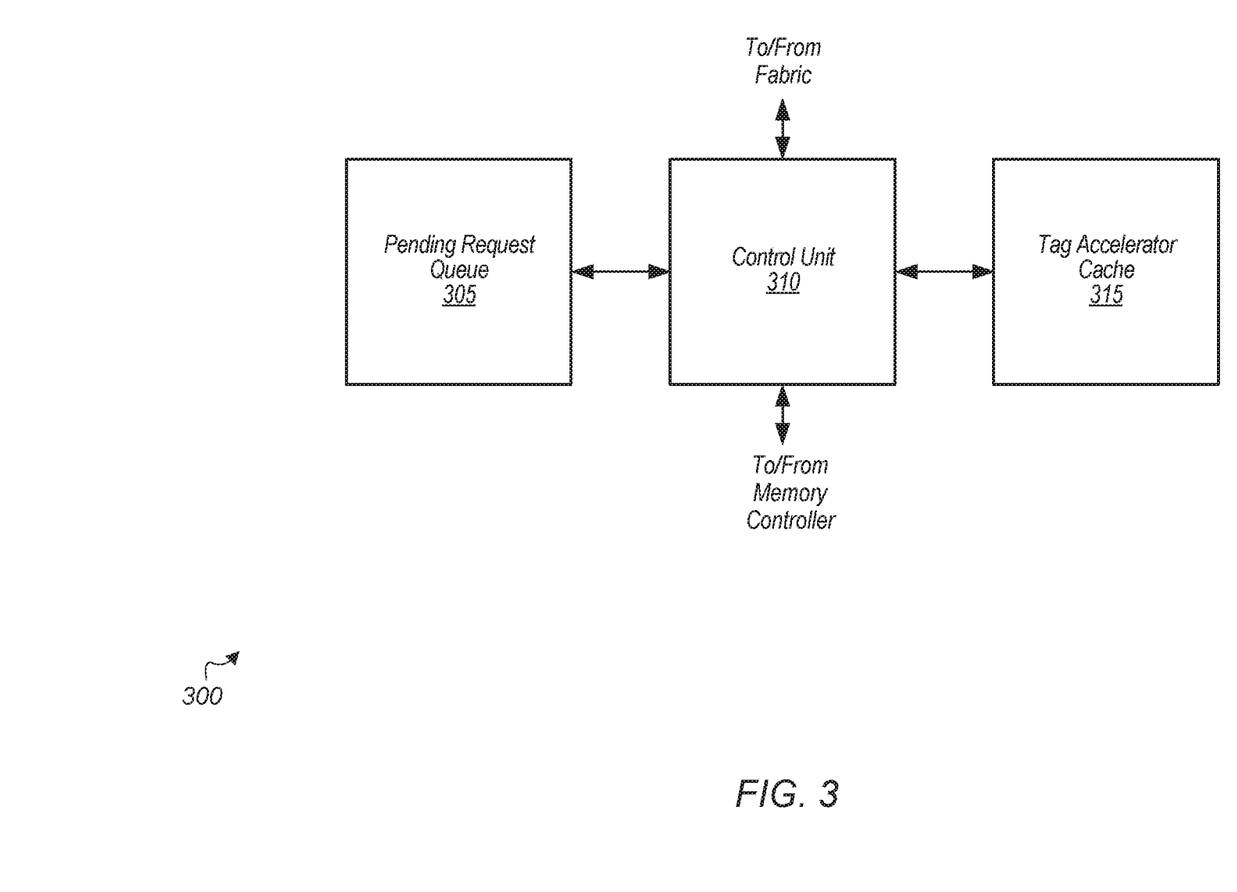
FIG. 3 is a block diagram of one embodiment of a coherent slave.

Referring now to FIG. 3, a block diagram of one embodiment of a coherent slave 300 is shown. In one embodiment, the components of coherent slave 300 are included in coherent slaves 220A-B, 235A-B, and 255A-B (of FIG. 2). Coherent slave 300 includes at least pending request queue 305, control unit 310, and tag accelerator cache 315. Pending request queue 305 is representative of any type and number of queues, buffers, or other types of storage elements for storing received memory requests. Tag accelerator cache 315 is configured to cache tag blocks and corresponding state information that are retrieved from a data cache (not shown). The state information can include a replacement state, cache coherency state, a dirty bit, and so forth of each cache line associated with the tags in the tag blocks. It is noted that tag accelerator cache 315 can also be referred to as a "tag accelerator structure" or a "tag cache". In one embodiment, tag accelerator cache 315 is implemented as an N-Way set-associative cache, wherein N is a positive integer greater than one. Control unit 310 is configured to process incoming memory requests and monitor and manage pending request queue 305 and tag accelerator cache 315. Control unit 310 can be implemented with any suitable combination of hardware and/or software.

When coherent slave 300 receives a memory request, the memory request is queued in pending request queue 305. Then, coherent slave 300 performs a tag lookup of tag accelerator cache 315 for the queued memory request. Each memory request has an associated tag, with the tag being a portion of the address targeted by the memory request. The tag lookup compares the memory request's associated tag to the tags stored at a given set of the tag accelerator cache 315, with the given set determined by the index portion of the memory request address. This tag lookup of tag accelerator cache 315 is performed prior to the memory request being conveyed to the data cache. If any of the tags in the indexed set of tag accelerator cache 315 is identical to the memory request's associated tag, then this means that the tag lookup is a hit. If the tag lookup of tag accelerator cache 315 is a hit for the queued memory request, then the data address (e.g., a specific way of the indexed set) corresponding to the matching tag is retrieved from tag accelerator cache 315. Then, a lookup is performed to a corresponding entry of the data cache to access the targeted cache line at a column corresponding to the retrieved data address.

If the tag lookup of tag accelerator cache 315 is a miss for the queued memory request, then the memory request is conveyed to the data cache and a tag lookup of the data cache is performed. If any of the tags in the corresponding entry of the data cache is identical to the memory request's associated tag, then this means that the tag lookup is a hit. If the tag lookup of the data cache is a hit, then a tag block (including the matching tag as well as a plurality of other adjacent tags) is retrieved from the matching entry in the data cache. This tag block is returned to coherent slave 300 and cached in tag accelerator cache 315. If the tag accelerator cache 315 is full, then one or more entries are evicted from tag accelerator cache 315 to make room for the tags of the retrieved tag block. Control unit 310 is configured to manage the eviction policy for tag accelerator cache 315. In one embodiment, control unit 310 utilizes a least recently used (LRU) algorithm to replace existing entries of tag accelerator cache 315. However, prior to evicting a tag entry from tag accelerator cache 315, control unit 310 checks queue 305 for any incoming requests which target the entry. If an incoming request in queue 305 targets the tag entry selected for eviction, then control unit 310 selects another tag entry for eviction which is not being targeted by any incoming requests. As used herein, a "tag entry" is defined as a tag (i.e., the tag portion of the memory address), state information (e.g., replacement state, cache coherency state, a dirty bit), and a corresponding data address. The data address of a tag entry points to a specific column of the data cache.

Figure 4:
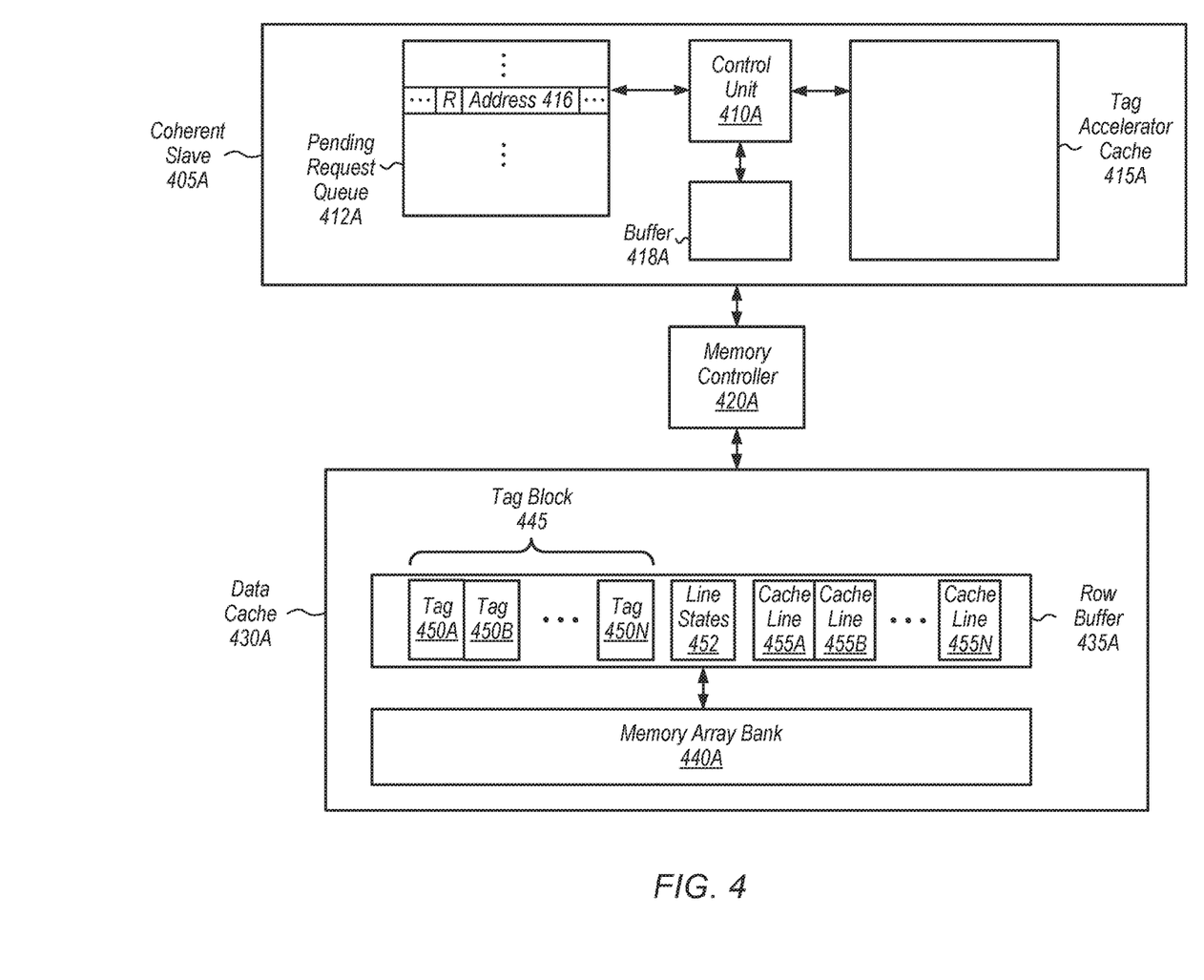
FIG. 4 is a block diagram of one embodiment of a coherent slave coupled to a data cache via a memory controller.

Turning now to FIG. 4, a block diagram of one embodiment of a coherent slave 405A coupled to a data cache 430A via a memory controller 420A is shown. In one embodiment, coherent slave 405A includes at least control unit 410A, pending request queue 412A, tag accelerator cache 415A, and buffer 418A. The capacity of each of pending request queue 412A, tag accelerator cache 415A, and buffer 418A can vary according to the embodiment. Coherent slave 405A is coupled to data cache 430A via memory controller 420A.

In one embodiment, data cache 430A is a level four (L4) cache within the overall cache hierarchy of the system. In other embodiments, data cache 430A can be other levels within the cache hierarchy. In one embodiment, each row of data cache 430A stores a plurality of tags and cache lines which are co-located in the row. The tags are arranged in the row such that a plurality of tags can be retrieved from a row in a single access.

Coherent slave 405A is configured to receive memory requests from a plurality of processing nodes (e.g., CPUs 205A-N of FIG. 2) via a communication fabric (e.g., fabric 218) and store the received memory requests in pending request queue 412A. As shown in FIG. 4, pending request queue 412A includes a read (R) memory request which targets a memory address 416. When a request is received by coherent slave 405A, a tag lookup of tag accelerator cache 415A is performed prior to forwarding the request to data cache 430A. It is assumed for the purposes of this discussion that the tag lookup of tag accelerator cache 415A misses for the read request to address 416. It is also assumed for the purposes of this discussion that this read request has been forwarded to data cache 430A, and a row, corresponding to an index portion of address 416, has been retrieved from memory array bank 440A and stored in row buffer 435A. In one embodiment, the organization of data and tags in data cache 430A results in tag block 445 (which includes tags 450A-N) as well as line states 452 and cache lines 455A-N being loaded into row buffer 435A from memory array bank 440A. It is noted that data cache 430A can have any number of other banks which are not shown to avoid obscuring the figure.

In one embodiment, data cache 430A is implemented with DRAM. Although only a single memory array bank 440A is shown in data cache 430A, it should be understood that data cache 430A can also include any number of other memory array banks. Each memory array bank of data cache 430A includes multiple rows. In one embodiment, each of the rows can store cache tags and cache lines for an N-way set-associative cache organization, wherein N is an integer greater than one. A different number of ways, such as 8 ways, 16 ways, 32 ways, or otherwise, can be chosen.

The row retrieved from bank 440A and stored in row buffer 435A stores multiple cache tags 450A-N. Cache tags 450A-N can also be referred to as tag block 445. As used herein, the term "tag block" is defined as a plurality of cache tags that are co-located together. The row stored in row buffer 435A also stores line states 452 and the data portions of corresponding cache lines 455A-N. Therefore, the memory array bank 440A of data cache 430A combines a tag array and a data array of a cache organization into a single physical structure.

In one embodiment, each row of memory array bank 440A stores metadata corresponding to the stored cache lines. For example, the row shown in row buffer 435A stores the state metadata in field 452 for cache lines 455A-N. Line states 452 can include at least one or more of the following for each corresponding cache line 455A-N: a valid bit, a cache line owner encoding that indicates the source which owns the corresponding cache line, Least Recently Used (LRU) eviction information used in association with a cache replacement algorithm employed by a cache controller, an indication that designates a cache coherency state such as modified, exclusive, owned, shared, invalid, or other, a dirty bit, prefetch hint information, profiling data, and so forth. Other types of state information are possible and contemplated. Although line states field 452 is shown as being separate from tag block 445, it is noted that in another embodiment, the bits of each line state can be stored together with each corresponding tag 450A-N. In this embodiment, each tag 450A-N includes extra bits to represent the line state of the corresponding cache line 455A-N.

In various embodiments, memory array bank 440A utilizes an N-Way set-associative cache organization, wherein the value of N can vary according to the embodiment. Although one embodiment of the data cache 430A is implemented utilizing DRAM memory technology, other memory technologies that use a row-based access scheme including one or more row buffers or other equivalent structures are possible and contemplated. Examples of other memory technologies include phase-change memories, spin-torque-transfer resistive memories, memristors, and so forth.

Figure 5:
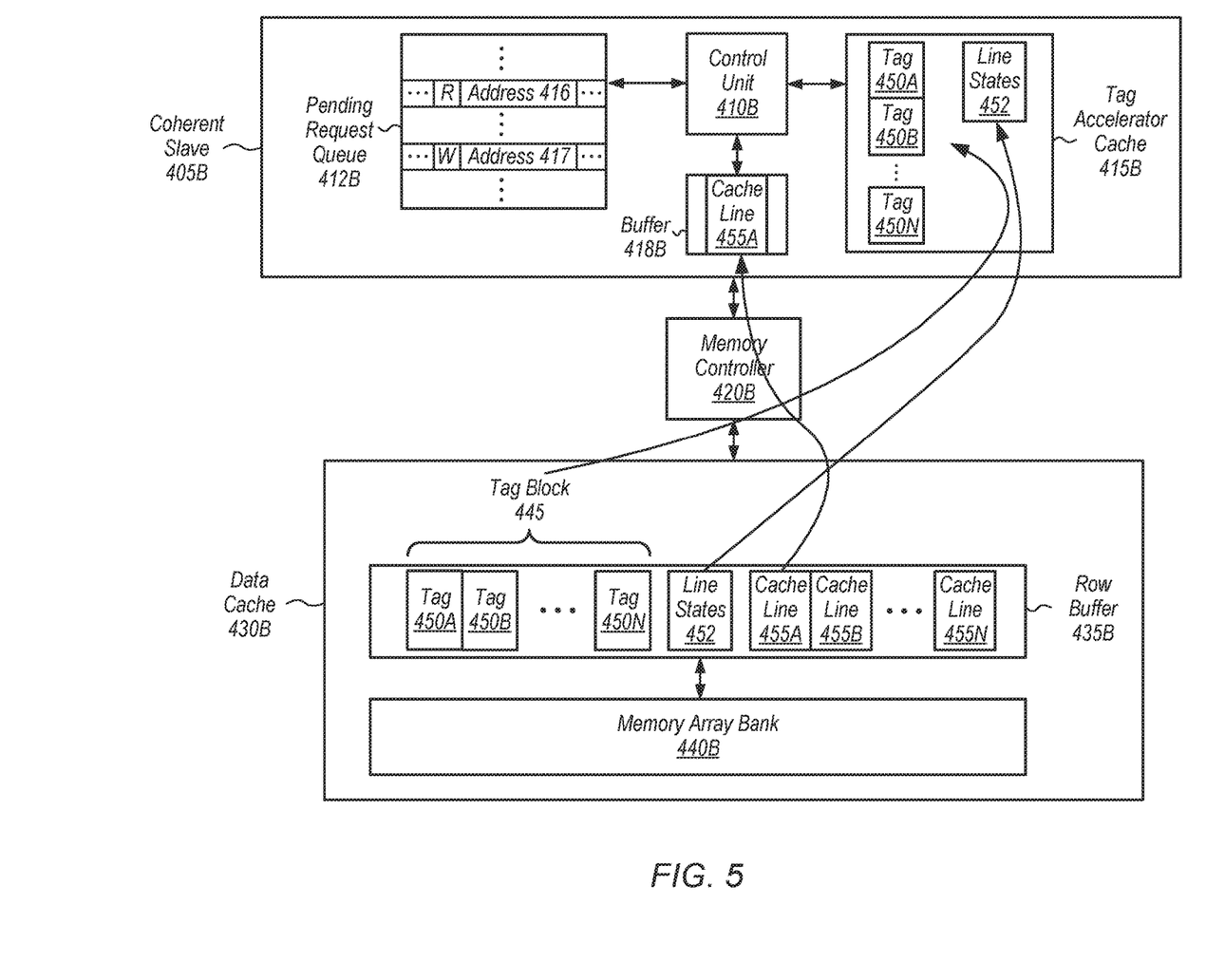
FIG. 5 is a block diagram of one embodiment of a coherent slave caching a tag block in a tag accelerator cache.

Referring now to FIG. 5, a block diagram of one embodiment of a coherent slave 405B caching a tag block 445 in a tag accelerator cache 415B is shown. The diagram of FIG. 5 is intended to be a continuation of the discussion regarding the elements of FIG. 4. Accordingly, coherent slave 405B, memory controller 420B, and data cache 430B are intended to represent coherent slave 405A, memory controller 420A, and data cache 430A (of FIG. 4), respectively, at a later point in time. Similarly, pending request queue 412B, control unit 410B, buffer 418B, and tag accelerator cache 415B are intended to represent pending request queue 412A, control unit 410A, buffer 418A, and tag accelerator cache 415A (of FIG. 4), respectively, at a later point in time.

It is assumed for the purposes of this discussion that the comparison of the tag portion of address 416 matches with tag 450A of tag block 445. Responsive to the tag lookup of row buffer 435B matching on tag 450A, tag block 445, line states 452, and cache line 455A are retrieved from row buffer 435B and returned to coherent slave 405B. Cache line 455A is stored in buffer 418B prior to being sent to the requesting node. Also, the tags 450A-N of tag block 445 and line states 452 are cached in tag accelerator cache 415B.

When a new request is received by coherent slave 405B and stored in pending request queue 412B, a tag lookup of tag accelerator cache 415B will be performed. If the address of the new request is a sequential address as compared to the address of the previous request, which is common for many types of workloads, the new request will likely hit in tag accelerator cache 415B for an adjacent tag retrieved from the previous access to data cache 430A. It is assumed for the purposes of this discussion that the tag lookup of tag accelerator cache 415B for the new write (W) request of address 417 matches tag 450B. Accordingly, in this case, tag accelerator cache 415B helps to reduce the power consumption and bandwidth of accesses to data cache 430B by determining a data address (i.e., the specific column or cache line to access) of the cache line corresponding to matching tag 450B rather than having to access data cache 430B to perform a tag comparison.

Due to the presence of spatial locality in applications, tag accelerator cache 415B can filter out a large number of tag accesses to data cache 430B resulting in latency and bandwidth savings. Additionally, when data is evicted from the data cache 430B, the associated tag state is updated and typically has to be written to data cache 430B. Writes are traditionally expensive in the memory technology used to implement data cache 430B and tag state updates are no exception. However, by implementing tag accelerator cache 415B in coherent slave 405B, tag state updates are written to tag accelerator cache 415B instead of to data cache 430B. Only when tag accelerator cache 415B has a capacity eviction is a dirty tag entry written back to data cache 430B. Accordingly, tag accelerator cache 415B is an effective write combining structure.

Figure 6:
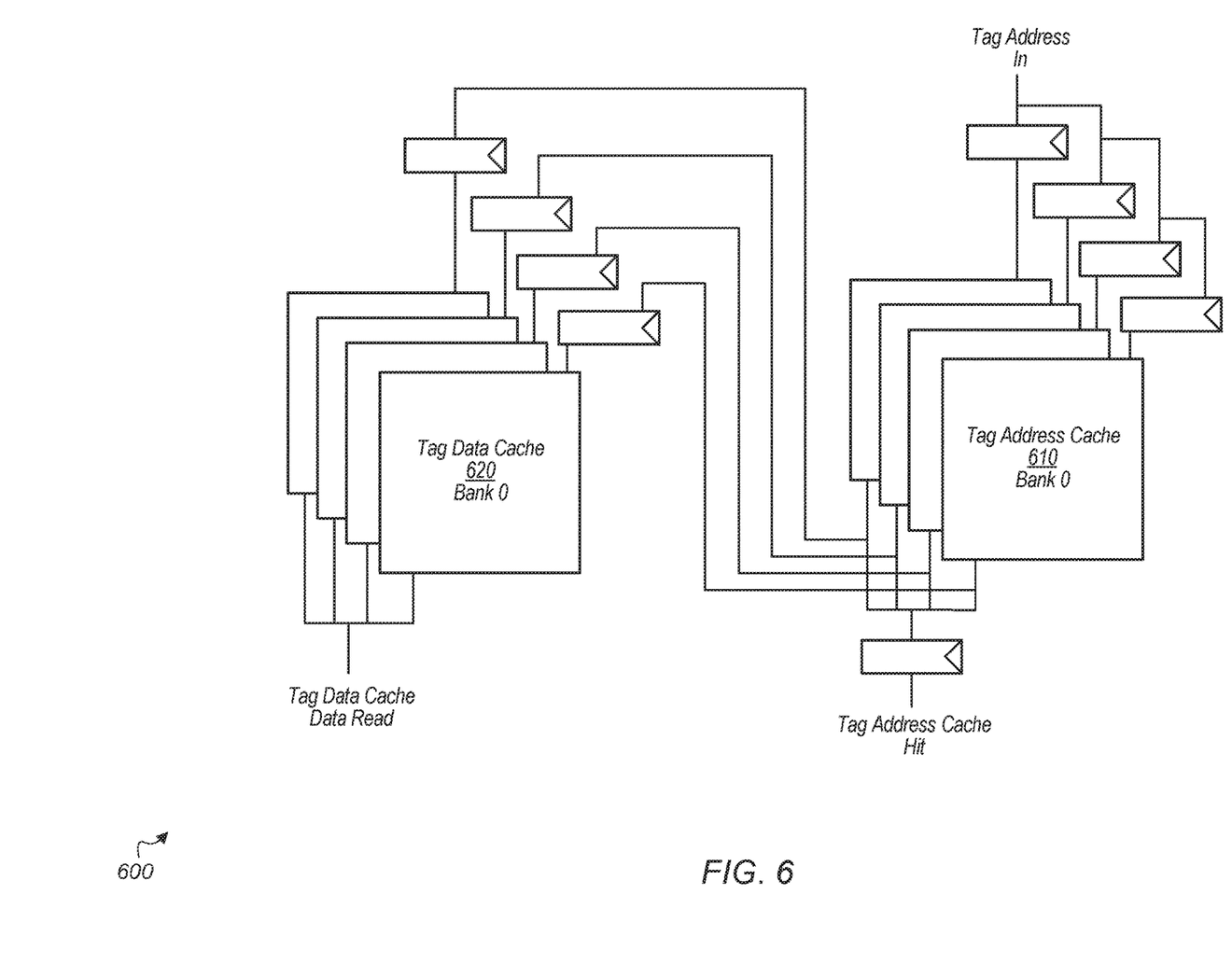
FIG. 6 is a block diagram of one embodiment of a tag accelerator cache.

Turning now to FIG. 6, a block diagram of one embodiment of a tag accelerator cache 600 is shown. Tag accelerator cache 600 includes at least tag address cache 610 and tag data cache 620. As shown in FIG. 6, tag address cache 610 and tag data cache 620 have four banks. However, it should be understood that this is indicative of one possible embodiment. In other embodiments, tag address cache 610 and tag data cache 620 can have other numbers of banks. In one embodiment, a tag address input is coupled to tag address cache 610. If there is a hit in any of the entries of tag address cache 610, this match is signaled to a corresponding entry of tag data cache 620. Then, a data address and state information is read out of the corresponding entry of tag data cache 620.

When an entry is accessed from a data cache (e.g., data cache 430A of FIG. 4) for a given memory request, a tag block with multiple tags is retrieved from the entry and conveyed to a coherent slave (e.g., coherent slave 405A). Then, the coherent slave can store the adjacent tags from the tag block corresponding to the given memory request into tag accelerator cache 600. The coherent slave can determine which entries to evict from tag accelerator cache 600 to make room for the new entries for the adjacent tags. Then, the coherent slave can allocate the adjacent tags from the retrieved tag block in the locations of the evicted entries.

Figure 7:
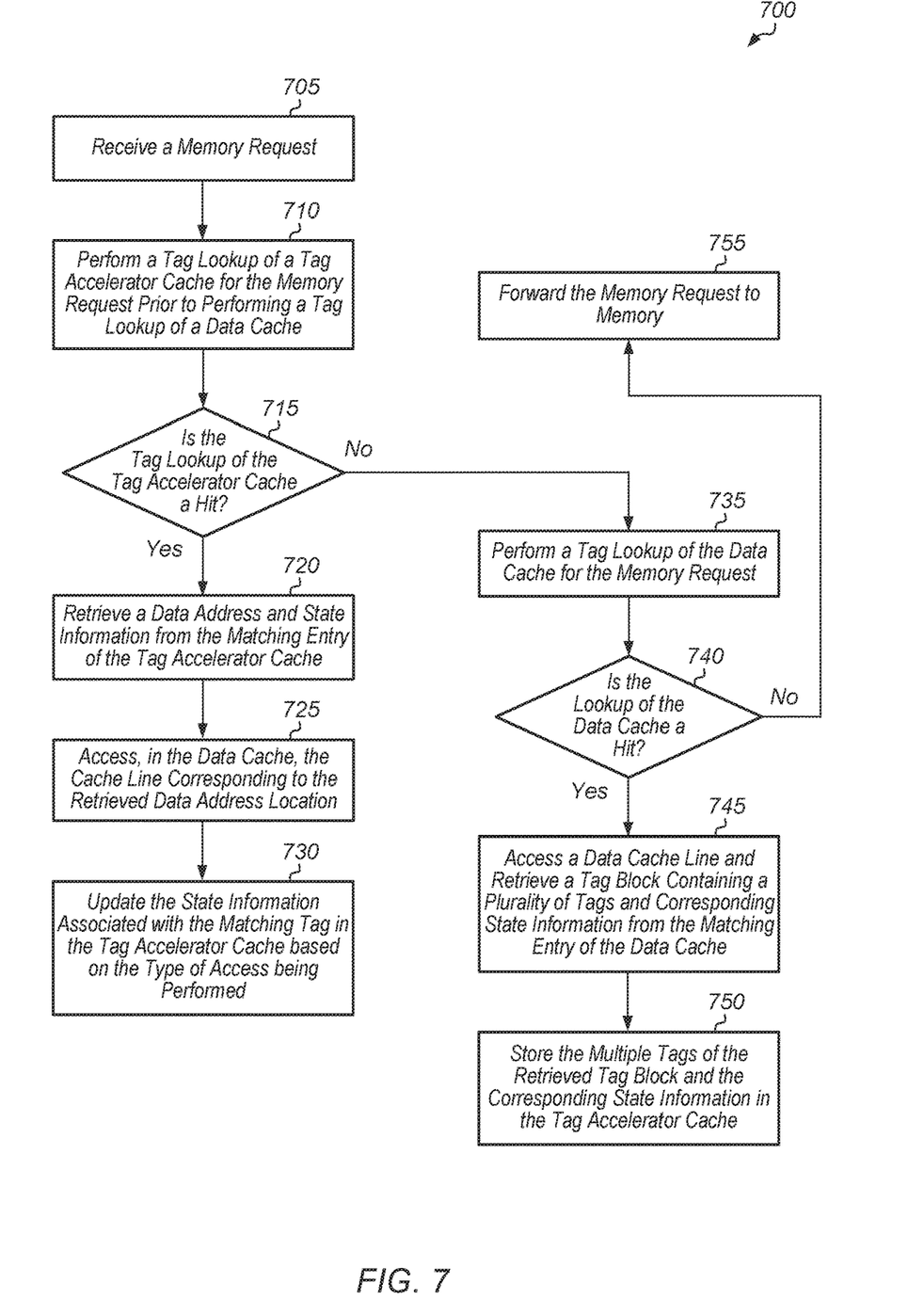
FIG. 7 is a generalized flow diagram illustrating one embodiment of a method for implementing a tag accelerator cache.
Figure 8:
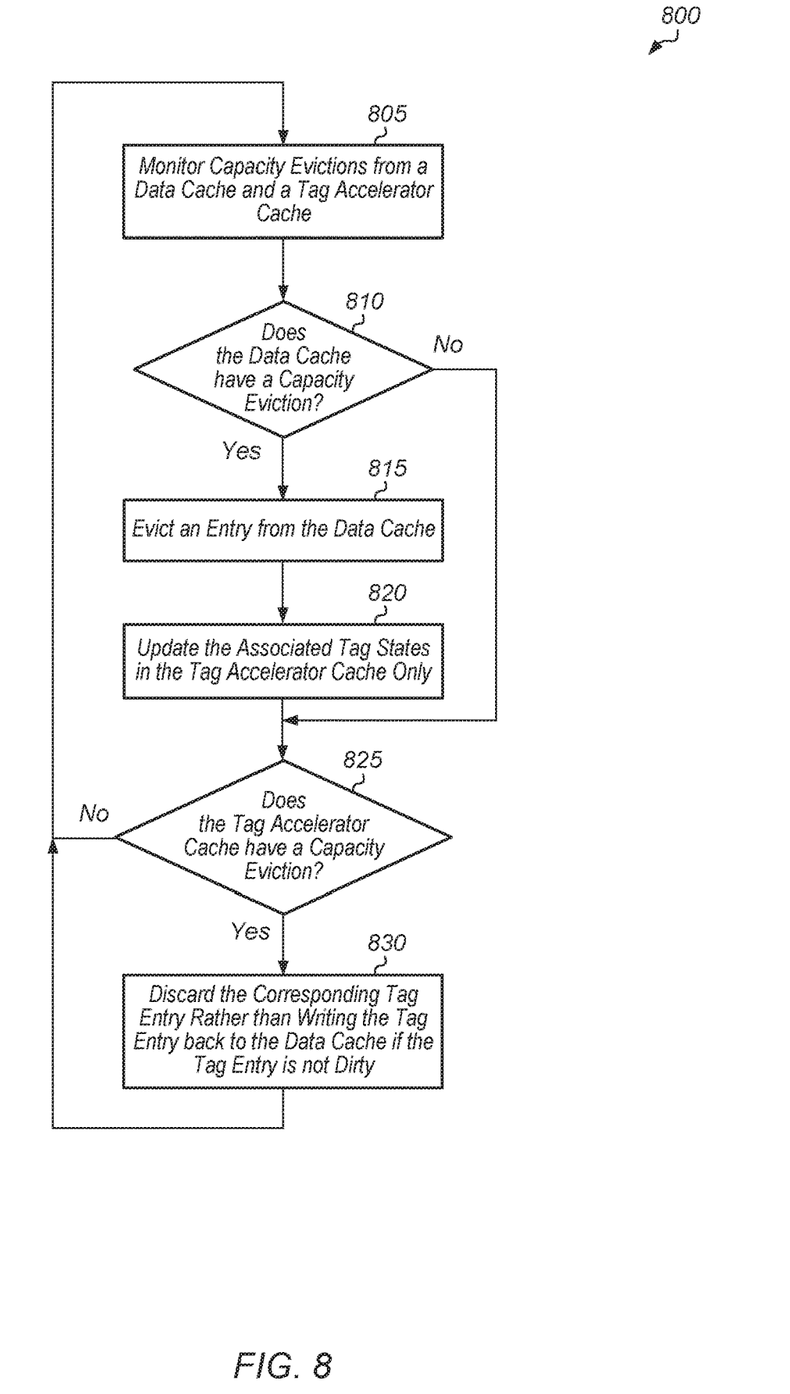
FIG. 8 is a generalized flow diagram illustrating another embodiment of a method for using a tag accelerator cache to combine tag writes.
Figure 9:
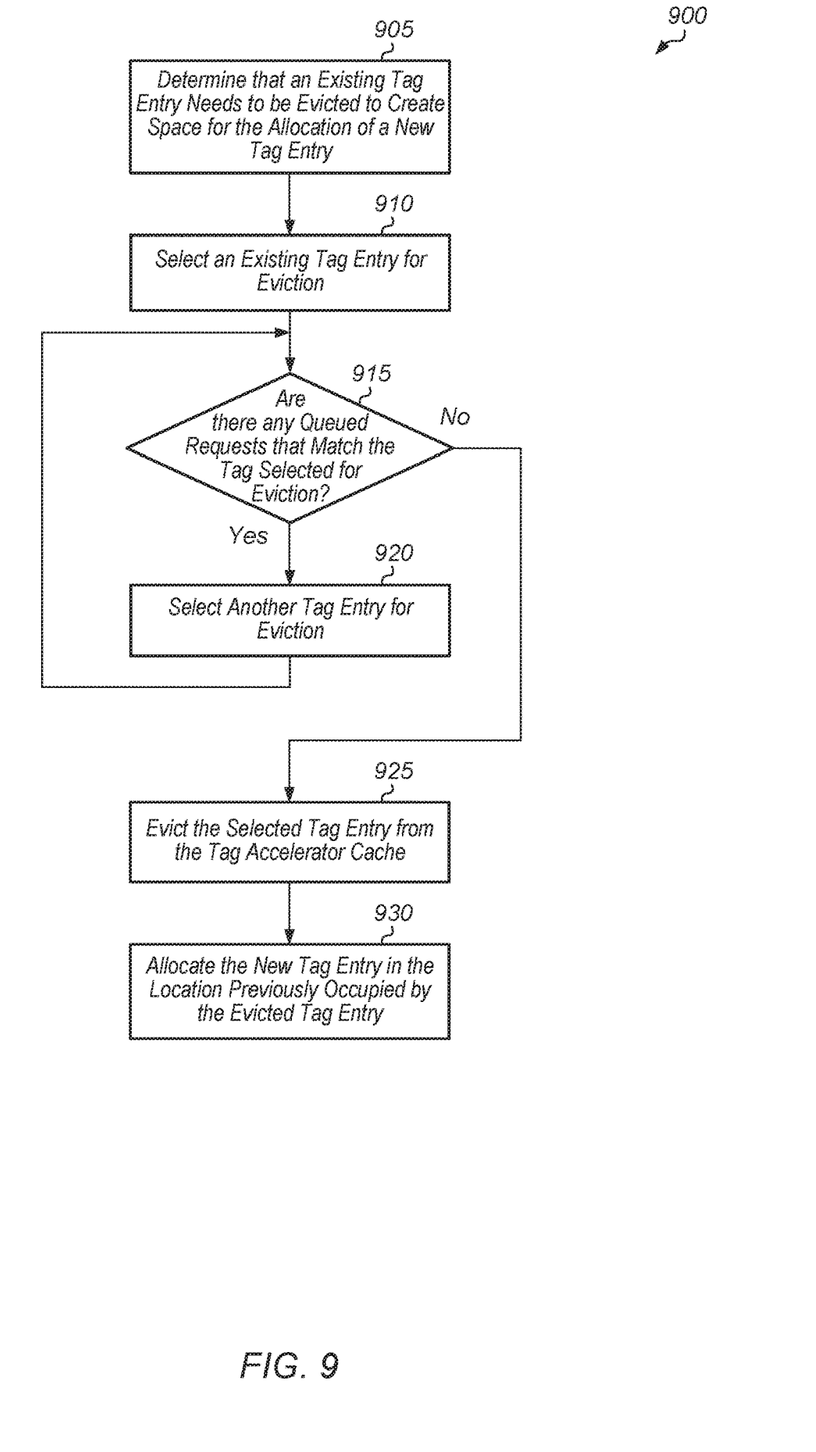
FIG. 9 is a generalized flow diagram illustrating one embodiment of a method for managing evictions from a tag accelerator cache.
Figure 10:
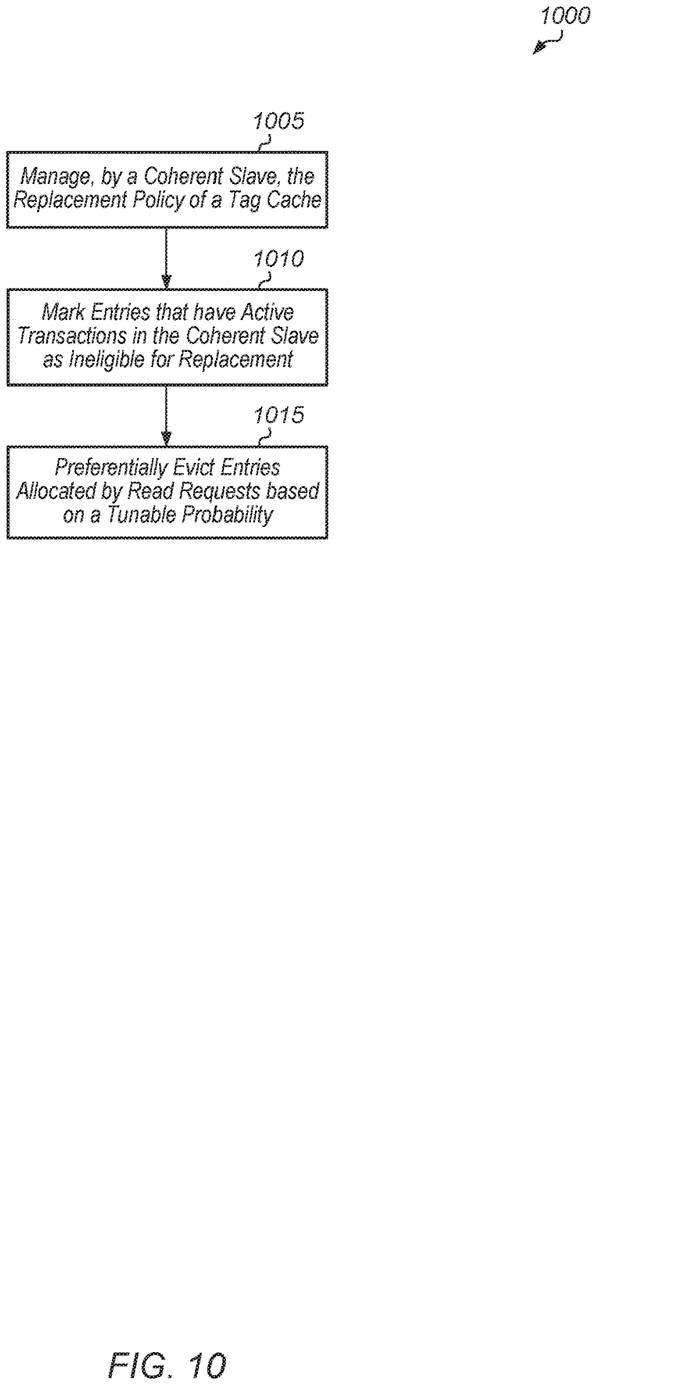
FIG. 10 is a generalized flow diagram illustrating another embodiment of a method for implementing a tag cache replacement policy.

Referring now to FIG. 7, one embodiment of a method 700 for implementing a tag accelerator cache is shown. For purposes of discussion, the steps in this embodiment and those of FIG. 8-10 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 700.

A coherent slave receives a memory request (block 705). The memory request can be a read request, write request, or a victim request. Next, the coherent slave performs a tag lookup of a tag accelerator cache for the memory request prior to performing a tag lookup of a data cache (block 710). If the tag lookup of the tag accelerator cache is a hit (conditional block 715, "yes" leg), then the coherent slave retrieves a data address and state information from the matching entry of the tag accelerator cache (block 720). Next, the coherent slave accesses, in the data cache, the cache line at the retrieved data address location (block 725). It is noted that the coherent slave does not need to perform a tag lookup to the data cache since the coherent slave has already matched on the tag in the tag accelerator cache. The coherent slave can also update the state information (e.g., dirty status, LRU status) associated with the matching tag in the tag accelerator cache based on the type of access being performed (block 730).

If the tag lookup of the tag accelerator cache is a miss (conditional block 715, "no" leg), then the coherent slave performs a tag lookup of the data cache for the memory request (block 735). If the tag lookup of the data cache for the memory request results in a hit (conditional block 740, "yes" leg), then the coherent slave accesses a data cache line and retrieves a tag block containing a plurality of tags and corresponding state information from the matching entry of the data cache (block 745). It is assumed for the purposes of this discussion that data and tags are co-located in the entries of the data cache. The coherent slave then stores the multiple tags of the retrieved tag block and the corresponding state information in the tag accelerator cache (block 750). If the lookup of the data cache for the memory request results in a miss (conditional block 740, "no" leg), then the coherent slave forwards the memory request to memory (block 755). After blocks 730, 750, and 755, method 700 ends.

Turning now to FIG. 8, one embodiment of a method 800 for using a tag accelerator cache to combine tag writes is shown. The coherent slave monitors capacity evictions from a data cache and a tag accelerator cache (block 805). It is assumed for the purposes of this discussion that tags and data are co-located in individual pages of the data cache.

While the coherent slave is monitoring the data cache, if the data cache has a capacity eviction (conditional block 810, "yes" leg), then an entry is evicted from the data cache (block 815). If the data cache does not have a capacity eviction (conditional block 810, "no" leg), then method 800 jumps to conditional block 830. In response to the data cache evicting the given cache line from the data cache, the coherent slave updates the associated tag states in the tag accelerator cache only (block 820). By updating the associated tag states in the tag accelerator cache only, the associated tag states in the data cache do not need to be updated. Updating a tag state in the data cache is typically more costly in terms of power consumption and latency as compared with updating tag states in the tag accelerator cache, and so it is advantageous to only update the associated tag states in the tag accelerator cache.

If the tag accelerator cache has a capacity eviction (conditional block 825, "yes" leg), the tag accelerator discards the corresponding tag entry rather than writing the tag entry back to the data cache if the tag entry is not dirty (block 830). After block 830, method 800 returns to block 805. If the tag accelerator cache does not have a capacity eviction (conditional block 825, "no" leg), then method 800 returns to block 805.

Referring now to FIG. 9, one embodiment of a method 900 for managing evictions from a tag accelerator cache is shown. A tag accelerator cache determines that an existing tag entry needs to be evicted to create space for the allocation of a new tag entry (block 905). The tag accelerator cache selects an existing tag entry for eviction (block 910). In one embodiment, the tag accelerator cache utilizes a LRU algorithm to determine which tag to select for eviction.

Next, the coherent slave checks the pending request queue to determine if there are any queued requests that match the tag of the tag entry selected for eviction (conditional block 915). If there is a queued request that matches the tag of the tag entry selected for eviction (conditional block 915, "yes" leg), then the coherent slave selects another tag entry for eviction (block 920). After block 920, method 900 returns to conditional block 915. If none of the queued requests match the tag of the tag entry selected for eviction (conditional block 915, "no" leg), then the selected tag entry is evicted from the tag accelerator cache (block 925). Then, the new tag entry is allocated in the tag accelerator cache location previously occupied by the evicted tag entry (block 930). After block 930, method 900 ends.

Turning now to FIG. 10, another embodiment of a method 1000 for implementing a tag cache replacement policy is shown. A coherent slave manages the replacement policy of a tag cache (block 1005). As part of managing the tag cache replacement policy, entries that have active transactions in the coherent slave are marked as ineligible for replacement (block 1010). Then, out of the eligible entries, the coherent slave preferentially evicts entries allocated by read requests based on a tunable probability (block 1015). In some embodiments, read requests have high temporal locality, and entries allocated by read requests should be replaceable more quickly than the entries allocated by victims. After block 1015, method 1000 ends.

In various embodiments, program instructions of a software application are used to implement the methods and/or mechanisms described herein. For example, program instructions executable by a general or special purpose processor are contemplated. In various embodiments, such program instructions can be represented by a high level programming language. In other embodiments, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HDL) such as Verilog can be used. In various embodiments, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   a data cache; and
   a control unit comprising a tag accelerator cache, wherein the control unit comprises circuitry configured to:
   detect a match to a first tag in a first row of the data cache for a first address of a first memory request;
   retrieve a plurality of tags which are adjacent to the first tag in the first row of the data cache, wherein the plurality of tags comprise a second tag;
   store the plurality of tags and corresponding data addresses in the tag accelerator cache;
   retrieve, from the tag accelerator cache, a data address corresponding to the second tag responsive to detecting a match to the second tag for a second address of a second memory request; and
   access a cache line, within the first row of the data cache, at a column corresponding to the data address of the second tag without having performed a tag lookup of the data cache for the second memory request.

2. The system as recited in claim 1, wherein the system is configured to access said cache line without having performed a tag lookup of the data cache for the second memory request, in further response to detecting the match to the second tag for the second address of the second memory request.

3. The system as recited in claim 1, wherein the control unit is configured to retrieve the data address corresponding to the second tag from the tag accelerator cache prior to performing a lookup of the data cache for the second memory request.

4. The system as recited in claim 1, wherein the control unit is further configured to update a given tag state in the tag accelerator cache responsive to the data cache evicting a corresponding cache line from the data cache.

5. The system as recited in claim 1, wherein the control unit is further configured to determine if a pending request queue stores any pending requests matching a given tag of a given tag entry responsive to selecting the given tag entry for eviction from the tag accelerator cache.

6. The system as recited in claim 5, wherein the control unit is further configured to select a different tag entry for eviction responsive to determining at least one pending request matches the given tag of the given tag entry.

7. The system as recited in claim 1, wherein the control unit is further configured to update a tag state associated with a matching tag in the tag accelerator cache based on a type of access being performed.

8. A method comprising:
   detecting a match to a first tag in a first row of a data cache for a first address of a first memory request;
   retrieving a plurality of tags which are adjacent to the first tag in the first row of the data cache, wherein the plurality of tags comprise a second tag;
   storing the plurality of tags and corresponding data addresses in a tag accelerator cache;
   retrieving, from the tag accelerator cache, a data address corresponding to the second tag responsive to detecting a match to the second tag for a second address of a second memory request; and
   accessing a cache line, within the first row of the data cache, at a column corresponding to the data address of the second tag without having performed a tag lookup of the data cache for the second memory request.

9. The method as recited in claim 8, further comprising accessing said cache line without having performed a tag lookup of the data cache for the second memory request, in further response to detecting the match to the second tag for the second address of the second memory request.

10. The method as recited in claim 8, further comprising retrieving the data address corresponding to the second tag from the tag accelerator cache prior to performing a lookup of the data cache for the second memory request.

11. The method as recited in claim 8, further comprising updating a given tag state in the tag accelerator cache responsive to the data cache evicting a corresponding cache line from the data cache.

12. The method as recited in claim 8, further comprising determining if a pending request queue stores any pending requests matching a given tag of a given tag entry responsive to selecting the given tag entry for eviction from the tag accelerator cache.

13. The method as recited in claim 12, further comprising selecting a different tag entry for eviction responsive to determining at least one pending request matches the given tag of the given tag entry.

14. The method as recited in claim 8, further comprising updating a tag state associated with a matching tag in the tag accelerator cache based on a type of access being performed.

15. An apparatus comprising:
   a data cache;
   a memory controller;
   a tag accelerator cache; and
   a coherent slave unit coupled to the data cache via the memory controller, wherein the coherent slave unit comprises circuitry configured to:
      detect a match to a first tag in a first row of the data cache for a first address of a first memory request;
      retrieve a plurality of tags which are adjacent to the first tag in the first row of the data cache, wherein the plurality of tags comprise a second tag;
      store the plurality of tags and corresponding data addresses in the tag accelerator cache;
      retrieve, from the tag accelerator cache, a data address corresponding to the second tag responsive to detecting a match to the second tag for a second address of a second memory request; and
      access a cache line, within the first row of the data cache, at a column corresponding to the data address of the second tag without having performed a tag lookup of the data cache for the second memory request.

16. The apparatus as recited in claim 15, wherein the apparatus is configured to access said cache line without having performed a tag lookup of the data cache for the second memory request, in further response to detecting the match to the second tag for the second address of the second memory request.

17. The apparatus as recited in claim 15, wherein the coherent slave unit is configured to retrieve the data address corresponding to the second tag from the tag accelerator cache prior to performing a lookup of the data cache for the second memory request.

18. The apparatus as recited in claim 15, wherein the coherent slave unit is configured to update a given tag state in the tag accelerator cache responsive to the data cache evicting a corresponding cache line from the data cache.

19. The apparatus as recited in claim 15, wherein the coherent slave unit is configured to determine if a pending request queue stores any pending requests matching a given tag of a given tag entry responsive to selecting the given tag entry for eviction from the tag accelerator cache.

20. The apparatus as recited in claim 19, wherein the coherent slave unit is configured to select a different tag entry for eviction responsive to determining at least one pending request matches the given tag of the given tag entry.

* * * * *